United States Patent
Davidsaver

(12) 
(10) Patent No.: US 6,609,349 B2
(45) Date of Patent: Aug. 26, 2003

(54) WINDOW FRAMING SYSTEM FOR EMBOSSED SURFACES

(75) Inventor: John E. Davidsaver, Kent, OH (US)

(73) Assignee: Formtech Enterprises, Incorporated, Stow, OH (US)

( * ) Notice: Subject to any disclaimer, the term of this patent is extended or adjusted under 35 U.S.C. 154(b) by 0 days.

(21) Appl. No.: 09/682,604

(22) Filed: Sep. 26, 2001

(65) Prior Publication Data

US 2002/0029533 A1 Mar. 14, 2002

(51) Int. Cl.⁷ .................................................. E04B 1/61
(52) U.S. Cl. ..................... 52/771; 52/775; 52/656.1; 52/656.9; 403/401; 403/403
(58) Field of Search ................. 52/771, 775, 788.1, 52/398, 769, 656.1, 656.9; 403/401, 402

(56) References Cited

U.S. PATENT DOCUMENTS

| | | | |
|---|---|---|---|
| 3,225,502 A | * 12/1965 | Hallauer | ....................... 52/461 |
| 4,141,403 A | 2/1979 | Church | |
| 4,525,966 A | * 7/1985 | Litchfield et al. | ............. 52/397 |
| 4,538,936 A | * 9/1985 | Zeidl | .......................... 403/402 |
| 4,714,373 A | * 12/1987 | Heekin | ....................... 403/402 |
| 5,189,862 A | 3/1993 | Lafleur | |
| 5,758,458 A | 6/1998 | Ridge | |
| 5,950,391 A | 9/1999 | Hagel | |
| 6,070,375 A | 6/2000 | Anderson et al. | |
| 6,167,657 B1 | 1/2001 | Burge et al. | |
| 6,279,289 B1 | 8/2001 | Soder et al. | |
| 6,318,037 B1 | 11/2001 | Hansen | |

* cited by examiner

*Primary Examiner*—Carl D. Friedman
*Assistant Examiner*—Nahid Amiri
(74) *Attorney, Agent, or Firm*—Buckingham, Doolittle & Burroughs, LLP; Louis F. Wagner

(57) ABSTRACT

The invention relates to window framing systems which use corner keys, and which seal against embossed surfaces, particularly for use in garage doors. The corner keys are insertable into hollow portions of extruded window frames and which preliminarily hold the window frame together prior to more permanent fastening within a garage door by a plurality of screws or even via a snap-fit arrangement. The angularity of at least two internal ribs of the corner key into which a fastener impinges thereupon, facilitates tightening engagement of each mitered window frame corner, leading to a superior appearance and preventing moisture from getting inside the window unit by the positioning of a sealing surface which seals on an edge of a door or panel.

63 Claims, 2 Drawing Sheets

WINDOW FRAMING SYSTEM FOR EMBOSSED SURFACES

BACKGROUND OF THE INVENTION

The invention relates to window framing systems which use corner keys, and which seal against embossed surfaces, particularly for use in garage doors. The corner keys are insertable into hollow portions of extruded window frames and which preliminarily hold the window frame together prior to more permanent fastening within a garage door by a plurality of screws or even via a snap-fit arrangement. The angularity of at least two internal ribs of the corner key into which a fastener impinges thereupon, facilitates tightening engagement of each mitered window frame corner, leading to a superior appearance and preventing moisture from getting inside the window unit.

Consumers often request the inclusion of a series of decorative windows in garage doors. These windows are usually incorporated into the upper section of the garage door. The windows are formed in individual panels of the upper section and provide daylight illumination of the closed garage. A window opening is generally cut or preformed in each panel into which a window is to be inserted.

In the past, a rather cumbersome window and window framework system was inserted into the opening. Improvements to this base system included using a corner key to facilitate holding the mitered frame together, followed by insertion into the window opening and ultimate fastening to the garage door using screws. This process, while partially effective did suffer from some drawbacks. First, while the insertion of a corner key into hollow voids contained within the extruded plastic frames did initially hold the mitered window frame together thereby facilitating initial insertion of the frame into the opening, subsequent screwing of the frame into the garage door resulted in the creation of a gap between the mitered edges of the window frame as the frame was drawn close to the planar surface of the garage door. This gap leads to both an inferior exterior appearance as well as permitting rain or other external moisture to seep through the gaps created in the corners and migrate downwardly through the garage door panels, leading to internal rusting of the door and often through repeated exposure to moisture, unsightly water trails containing rust particles on both the exterior and interior garage door panels.

Additionally, the window framework system presented problems in sealing against the exterior, and possibly interior surface of a garage door, in that these doors almost always include some form of a decoratively embossed or bas-relief surface. This surface treatment provides important decorative and structural functions. Decoratively, this surface treatment is designed to mimic conventional wood panels while structurally it imparts a certain degree of dimensional stability to the garage door section. However, while an embossed surface is esthetically pleasing, the surface texture makes it difficult to effectively seal upon.

In the embossing process, a plurality of impressions are formed in a substrate, e.g., steel, by working rolls. Plateaus are formed between impressions. The inclination (i.e., slope) of surfaces of the substrate between plateaus and impressions is important for many reasons. It has been found to be an important surface feature with respect to premature corrosion, discoloration, and non-aesthetically pleasing appearance. Unduly high slopes of surfaces cause paint to flow downward into impressions leading to paint thinning at transition points between plateaus and impressions, which makes these sites prone to premature corrosion. Slopes which are too low, on the other hand, cause a loss of crispness in the painted embossed surface, which leads to a less aesthetically pleasing appearance. The balancing of these factors has additionally led to problems in trying to place and seal window frames into these highly embossed garage door panels, in that the linear distance between a recessed plateau and a raised impression is almost impossible to seal using a thin flexible strip of coextruded polymer, which is positioned on the raised impressions. While the thin flexible strip may sag between the raised impressions, it is not possible for this strip to physically conform into the plateaus, thereby inherently leading to a leaking situation.

The Prior Art solutions fail to effectively provide a window framework system which effectively seals against a high-relief embossed surface.

SUMMARY OF THE INVENTION

In accordance with the present invention, there is provided a shift in the paradigm of conventional wisdom and effects sealing engagement with an edge of an opening which has been cut into a garage door panel, rather than on the highly embossed surface.

It is an object of this invention to effect sealing engagement with the cut edge of a garage door panel with a flexible coextruded inwardly angled seal on the window frame, the opposite direction of conventional outwardly angled seals.

It is another object of this invention to use a corner key fastener for use in the decorative window system for a window opening in a garage door wherein the installation of the decorative window framing system is achieved by the use of these corner keys inserted into hollow extruded plastic window frame with subsequent attachment into the garage door by screws or snap-fit engagement with a mating engagement frame on an opposed side of the garage door panel.

It is an object of this invention to provide improvements in the area of the installation of garage door window systems.

It is another object of this invention to provide improvements in the formation of the decorative window systems by achieving a secure and tight framing system by imparting at least a non-transverse vector force component to the window frame by the deployment of at least a pair of angled ribs within the corner key. The use of these corner key fasteners in a window framing system achieves a more secure and tighter seal at the miter joint of the frame, thus preventing moisture, water, or other natural elements from entering the hollow interior of the garage door.

These and other objects of this invention will be evident when viewed in light of the drawings, detailed description and the pending claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION

Figure 1:
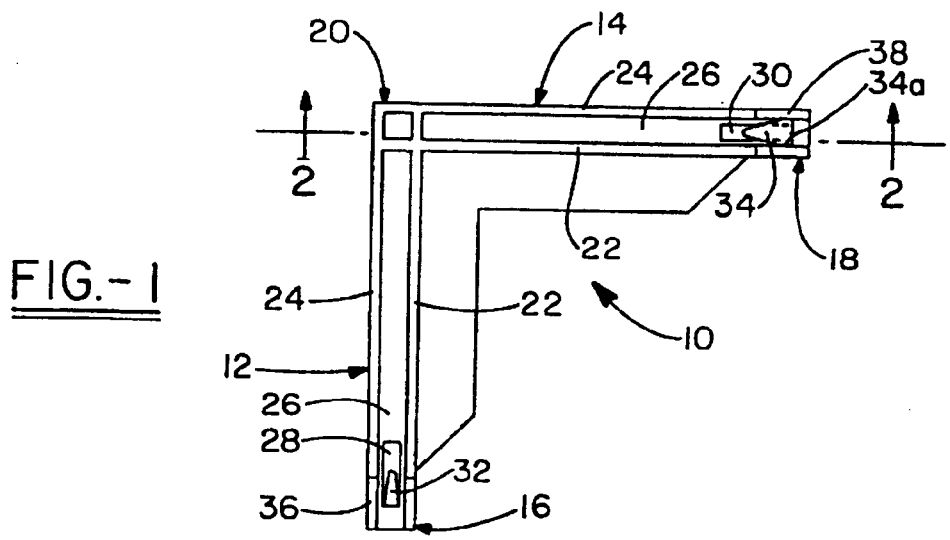
FIG. 1 is a plan view of a corner key in accordance with the present invention.
Figure 2:
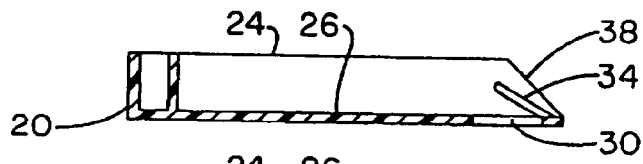
FIG. 2 is a sectional view of the key shown in FIG. 1 as may be taken at line 2—2 in the Figure.

Referring now to the drawings wherein the showing is for the purpose of illustrating the preferred embodiment of the invention only and not for purposes of limiting the same, the figures show a corner key which connects the framing system without resort to the installation methods involving either physical pounding or the use of machine screws with nuts alone in conjunction with an effective sealing method which is applicable to embossed surfaces.

As illustrated in FIG. 1, a 90° corner key device 10 is shown having two perpendicularly extending legs 12, 14 joined at a common vertex 20, and two ends 16, 18. One leg of the corner key device will be at least partially inserted into mating engagement with a first receiving longitudinal hollow void of an extruded plastic profile, while the other leg is at least partially inserted into mating engagement with a second receiving hollow void of an extruded plastic profile. While the device typically has a plane of symmetry, typically a mirror image opposed side, there is no requirement to limit to such, and the invention is applicable to situations where the legs have different geometries, physical dimensions and links.

While the key corner device 10 shown in FIG. 1 has a 90° bend, it is recognized that this is due to the fact that the typical garage door window has four sides, thereby necessitating this angle. For other window configurations, the angle of the key corner device is a matter of common knowledge of trigonometry. While the length of the two legs of the corner device as shown in the figure are equal, there is no need to limit the invention to such, and it is possible for either leg of the device to extend into the longitudinal receiving void to varying degrees, depending on the application requirements for corner rigidity and dimensional stability. The device will penetrate at least part way longitudinally and into the hollow voids.

Each leg of the key will have an interior 22 and exterior 24 wall with contiguous floor thereby creating a channel profile. In one embodiment, the interior and exterior walls will have a slight taper 36, 38 at both peripheral ends 16, 18 of the key device. This tapered arrangement facilitates insertion of each leg of the device into the mating hollow voids of the extruded frame. The floor 26 of each leg 12, 14 has at least one aperture 28, 30 disposed therein, typically positioned toward a peripheral end 16, 18 of the key device. Each leg of the device additionally has at least one inwardly angled rib 32, 34 positioned so as to intersect a vertical axis of the at least one aperture. The angle of the inwardly angled ribs 32, 34 must be less than 90°, preferably from approximately 10° and 80° inclusive, more preferably from approximately 30° and 80° inclusive, and most preferably from 45° and 70° inclusive. Depending on the degree of stiffness required of the corner key, the inwardly angled ribs may be in connected relationship with an interior wall 22 along the entire length of the rib or only in connected relationship with a portion 34a of the length of the rib. As illustrated with inwardly angled rib 32, if the strength of the rib is sufficient, there may be no contact with either interior wall 22 along a length of the rib.

Figure 3:
FIG. 3 is a sectional view similar to FIG. 2 but showing a fastener as may be applied to the key.
Figure 4:
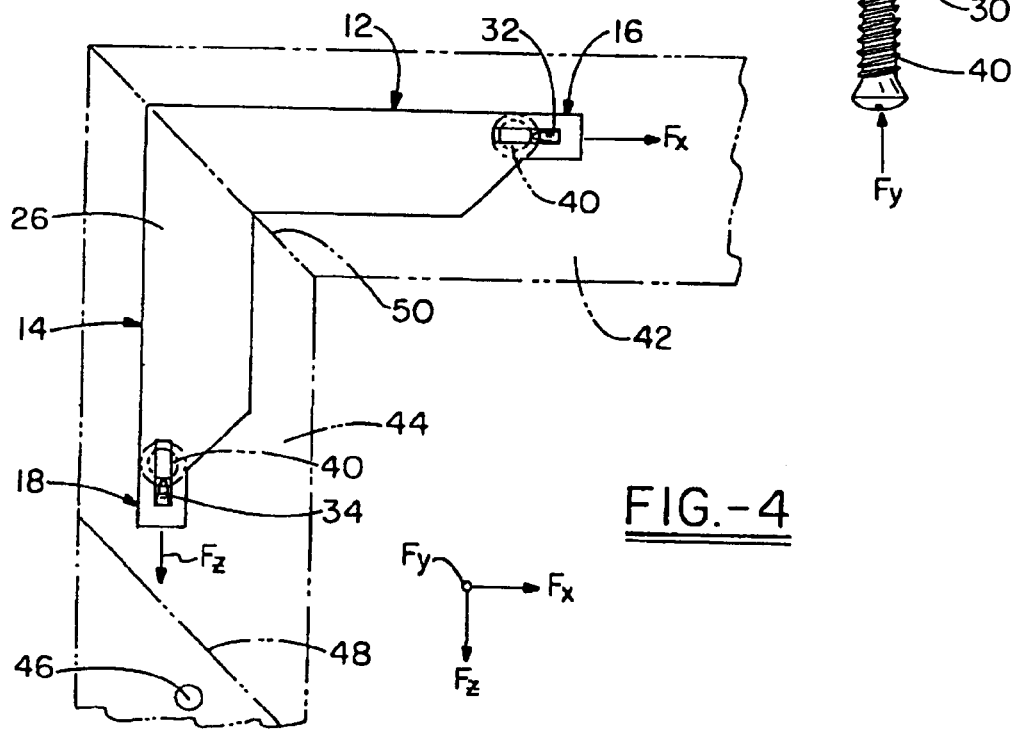
FIG. 4 is a plan view of the opposite face of the key shown in FIG. 1 illustrating its application to a window framework which is illustrated in ghost lines.

Insertion of a fastening device, e.g., screw 40, through an exterior mitered frame of the framing system generates an axial downward force $F_y$ (i.e., Y-direction) as illustrated in FIGS. 3 & 4, permitting axial movement through an opening 46 in the window system and in colinear alignment with an aperture e.g., 30 of the key device. With further penetration of the fastening device into a channel 26 of the device, impinging contact is made with inwardly angled rib 34 which imparts a lateral deflecting force vector having at least a component normal to penetrating axial movement ($F_z$ or z-direction as illustrated in FIG. 4 for window framing member 44 and $F_x$ or x-direction as illustrated for window framing member 42). As the fastening device continues to migrate upwardly on the angled rib or ramp, additional vector forces normal to the axis of penetration are created which force the window frame to force the window frame in the direction of its opposed mitered corner end (not shown). Each ramp does the same behavior with the result being that each mitered corner is in tight communication resulting in an aesthetically pleasing visual appearance lacking in mitered corner gaps 48, 50.

Figure 5:
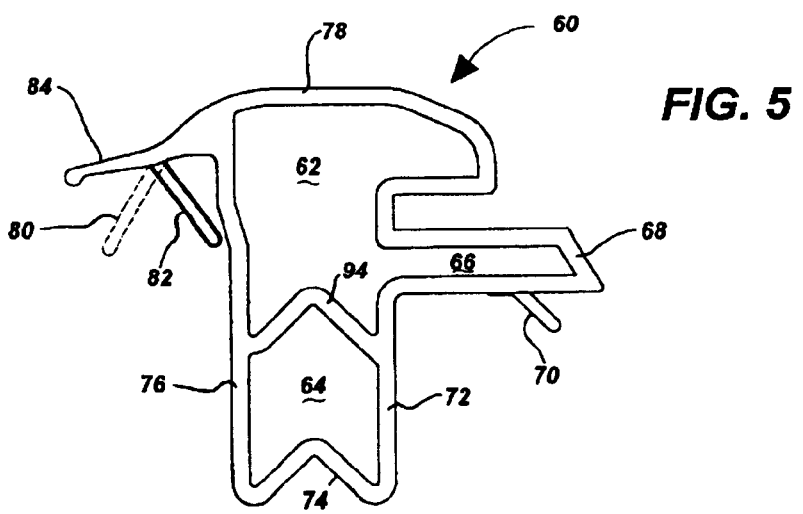
FIG. 5 is a cross-sectional view of a window frame having hollow portions disposed therein showing a Prior Art outwardly facing sealing strip in ghost lines and an inwardly facing sealing strip of the present invention.
Figure 6:
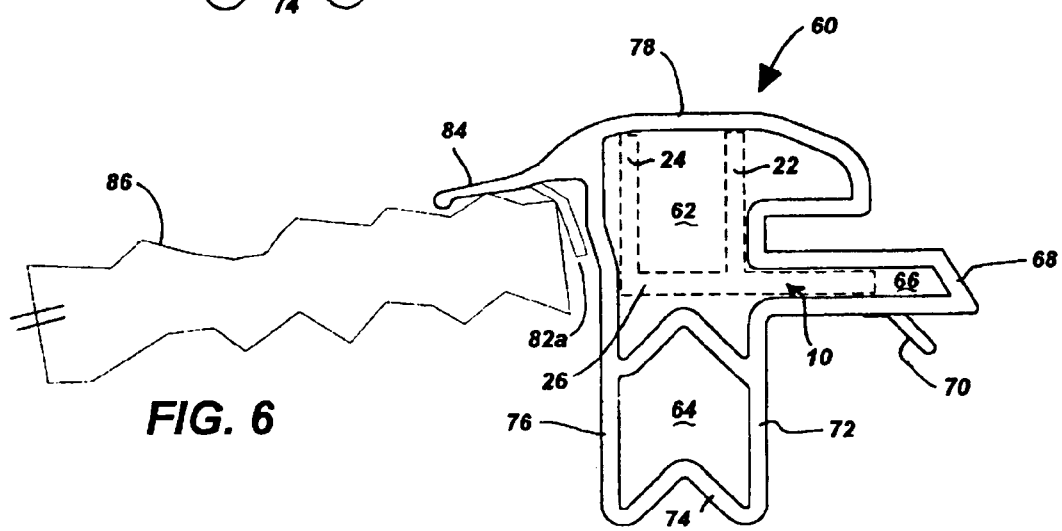
FIG. 6 is a cross-sectional view of a window frame of FIG. 5 showing the inwardly facing sealing strip sealing on an edge of one partially shown embossed garage door panel with a corner key of FIGS. 1–4 shown inserted into one hollow void in ghost lines.

Use of the corner key described above is but a first step in the ability to insert a window frame into a stamped opening in a garage door panel. The second step involves the ability of the installer to produce an essentially water-proof seal on an embossed surface where the difference between an elevated impression and a recessed plateau makes it difficult, if not close to impossible to effect an effective seal. As illustrated in FIG. 5, the window frame 60 into which a pane of glass will be sandwiched between (not shown) will include at least one hollow internal void 62, having a pair of side walls 72, 76, a bottom and a top 74, 78. The frame will optionally have a laterally extending leg 68 with leg void 66 therein. When required, a reinforcing rib 94 can optionally be extruded therein thereby creating a secondary void 64 adjacent to the primary void 62. In order to minimize any leakage on the interior side of the window frame, to which the glass is positioned adjacent thereto, a flexible seal 70 is coextruded with the window frame. Such coextrusions are known in the industry and typically involve a dual die head.

On the exterior side of the window frame, a second flexible seal is typically coextruded thereto on frame overlapping section 84. In the Prior Art, this flexible seal was an outwardly facing seal 80, and this arrangement is suitable for applications whereupon the sealing surface is essentially smooth. However, newer garage door panels are manufactured so as to mimic the look of wood and the metal door panels are embossed to attempt to reproduce the texture wood. It is known that attempting to effectively seal on an embossed surface using an outwardly facing seal which originates from the shelf is minimal.

Shifting the paradigm and focusing the efforts on sealing the window frame into the embossed garage door panel by sealing on an edge of the door panel using an inwardly facing seal 82a, however, can achieve the desired results. As illustrated in FIG. 5, a portion of an embossed garage door panel 86 is shown in secured engagement with an inwardly facing seal 82 of the window frame 60. By sealing on an edge, rather than an embossed exterior surface, an essentially leak-tight seal can be achieved which effects the goals of minimizing water ingress into the interior of the door panel, with attendant staining and rusting issues. Additionally, as illustrated in FIG. 5, the corner key 10 is insertable into a void 62 of the window frame 60 for initial engagement of the mitered corners. In a manner similar to that shown in FIG. 1, the key has two essentially parallel legs 22, 24 extending essentially vertically from a base 26.

Figure 7:
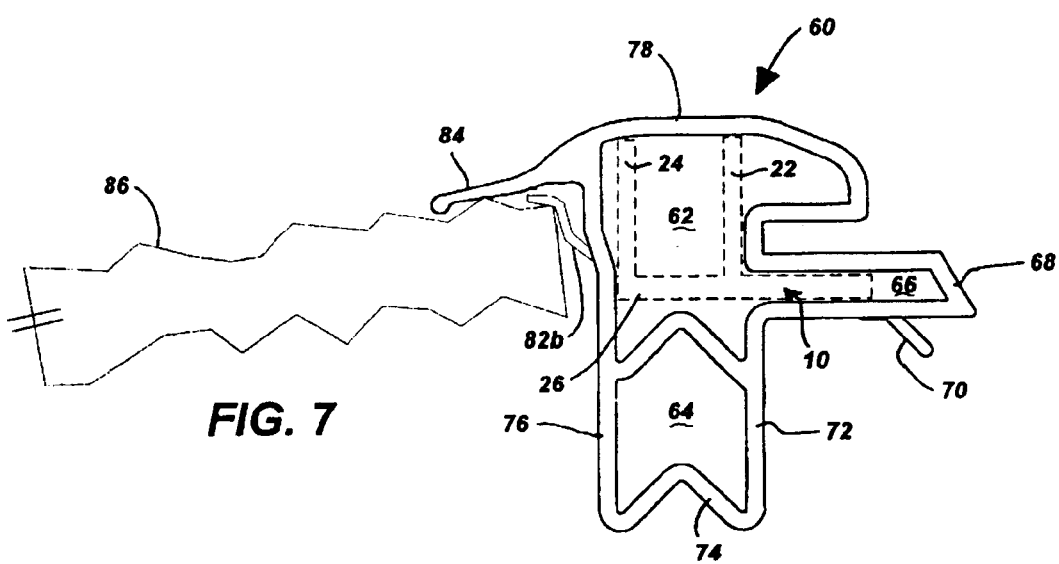
FIG. 7 is a cross-sectional view of a window frame of FIG. 5 showing the outwardly facing sealing strip sealing on an edge of one partially shown embossed garage door panel with a corner key of FIGS. 1–4 shown inserted into one hollow void in ghost lines.

While inwardly facing seal 82a has been described so far as being coextruded from panel overlapping section 84, there is no need to limit the attachment point to that location. In fact, in many applications, it is desirable to have this seal 82b affixed to side wall 76 and extending in a similarly angled fashion toward overlapping section 84 as illustrated in FIG. 7. The important consideration is that effective sealing engagement is made with the seal and an edge of the door panel and not with the embossed surface.

Thus, what has been described is both a window framing corner key and a window framing system utilizing the same, particularly suitable for use in garage door applications, although the application is not limited to such, but rather encompasses any situation wherein a window with associated frame needs to be assembled on-site and with minimal assistance. One of the aspects of the invention is the capitalization on an inwardly facing angled rib within a channel of the key device. As a fastening means, e.g., screw is pushed axially through a hole in a mitered window frame, and through an aperture in colinear alignment with the mitered window frame hole, a biasing force is generated normal to the axis of the fastening device which forces the window frame in tight physical alignment with the mitered corners, thereby promoting an aesthetically pleasing appearance with minimal opportunity for exterior weather elements to penetrate inside the door.

This invention has been described in detail with reference to specific embodiments thereof, including the respective best modes for carrying out each embodiment. It shall be understood that these illustrations are by way of example and not by way of limitation.

What is claimed is:

1. A frame component which comprises:
   (a) an interior side, an exterior side, a top side and a bottom side;
   (b) said top side having a ledge extending laterally from said top side;
   (c) a flexible seal extending from a bottom side of said ledge and directioned toward said exterior side for sealing engagement with an edge or a lateral side of a panel; and
   (d) said sides form at least one void disposed therebetween, said void having at least one reinforcing rib.

2. The component of claim 1 which further comprises
   (a) at least one interiorly extending leg from said interior side.

3. The component of claim 2 which further comprises
   (a) at least one flexible seal extending from a bottom side of said interiorly extending leg.

4. The component of claim 1 which further comprises
   (a) a right angle key.

5. The component of claim 4 wherein said key comprises:
   (a) a pair of laterally extending legs, each of said legs joined at a vertex;
   (b) each leg comprising
       (i) a pair of walls and a floor in connected relationship with said walls forming a channel,
       (ii) each floor having an aperture disposed therein;
   (c) each channel comprising
       (i) at least one inwardly facing rib in connected relationship with said channel walls positioned so as to intersect a vertical axis of said at least one aperture in each of said channel floors.

6. The component of claim 5 wherein
   (a) an angle defined between said floor and said inwardly angled rib is from approximately between 10° and 80° inclusive.

7. The component of claim 6 wherein
   (a) said angle is from approximately 45° and 70°.

8. The component of claim 5 wherein
   (a) at least one pair of channel walls have a taper at an end thereof.

9. The component of claim 8 wherein
   (a) both pairs of channel walls have a taper at said ends.

10. The component of claim 4 which comprises:
    (a) a pair of laterally extending legs, each of said legs joined at a vertex;
    (b) each leg comprising
        (i) a pair of walls and a floor in connected relationship with said walls forming a channel,
        (ii) each floor having an aperture disposed therein;
    (c) each channel comprising
        (i) at least one inwardly deflecting means positioned so as to intersect a vertical axis of said at least one aperture in each of said channel floors.

11. The component of claim 10 wherein
    (a) an angle defined between said floor and said inwardly angled rib is from approximately between 10° and 80° inclusive.

12. The component of claim 11 wherein
    (a) said angle is from approximately 45° and 70°.

13. The component of claim 12 wherein
    (a) at least one pair of channel walls have a taper at an end thereof.

14. The component of claim 13 wherein
    (a) both pairs of channel walls have a taper at said ends.

15. The component of claim 4 wherein
    (a) said inwardly deflecting means is an inwardly facing rib in connected relationship with said channel walls.

16. The component of claim 4 which comprises
    (a) at least two frame components in connected relationship with the right angle key.

17. The component of claim 10 which comprises
    (a) at least four frame components and four right angle keys in connected relationship.

18. A frame component which comprises:
    (a) an interior side, an exterior side, a top side and a bottom side,
    (b) said top side having a ledge extending laterally from said top side; and
    (c) a flexible seal extending from said exterior side and directioned toward said ledge for sealing engagement with an edge or a lateral side of a panel.

19. The component of claim 18 wherein
    (a) said sides form at least one void disposed therebetween.

20. The component of claim 19 which further comprises
    (a) at least one reinforcing rib within said at least one void.

21. The component of claim 18 which further comprises
(a) at least one interiorly extending leg from said interior side.

22. The component of claim 21 which further comprises
(a) at least one flexible seal extending from a bottom side of said interiorly extending leg.

23. The component of claim 18 which further comprises
(a) a right angle key.

24. The component of claim 23 wherein said key comprises:
(a) a pair of laterally extending legs, each of said legs joined at a vertex;
(b) each leg comprising
  (i) a pair of walls and a floor in connected relationship with said walls forming a channel,
  (ii) each floor having an aperture disposed therein;
(c) each channel comprising
  (i) at least one inwardly facing rib in connected relationship with said channel walls positioned so as to intersect a vertical axis of said at least one aperture in each of said channel floors.

25. The component of claim 24 wherein
(a) an angle defined between said floor and said inwardly angled rib is from approximately between 10° and 80° inclusive.

26. The component of claim 25 wherein
(a) said angle is from approximately 45° and 70°.

27. The component of claim 24 wherein
(a) at least one pair of channel walls have a taper at an end thereof.

28. The component of claim 27 wherein
(a) both pairs of channel walls have a taper at said ends.

29. The component of claim 23 which comprises:
(a) a pair of laterally extending legs, each of said legs joined at a vertex;
(b) each leg comprising
  (i) a pair of walls and a floor in connected relationship with said walls forming a channel,
  (ii) each floor having an aperture disposed therein;
(c) each channel comprising
  (i) at least one inwardly deflecting means positioned so as to intersect a vertical axis of said at least one aperture in each of said channel floors.

30. The component of claim 29 wherein
(a) an angle defined between said floor and said inwardly angled rib is from approximately between 10° and 80° inclusive.

31. The component of claim 30 wherein
(a) said angle is from approximately 45° and 70°.

32. The component of claim 31 wherein
(a) at least one pair of channel walls have a taper at an end thereof.

33. The component of claim 32 wherein
(a) both pairs of channel walls have a taper at said ends.

34. The component of claim 24 wherein
(a) said inwardly deflecting means is an inwardly facing rib in connected relationship with said channel walls.

35. The component of claim 23 which comprises
(a) at least two frame components in connected relationship with the right angle key.

36. The component of claim 35 which comprises
(a) at least four frame components and four right angle keys in connected relationship.

37. A window framing system which comprises:
(a) at least three at least partially hollow window frames,
  (i) each of said window frames mitered at an angle so as to effect complete closure of the frame,
  (ii) each of said window frames having at least two apertures disposed therein;
  (iii) each of exterior side of said window frames having a flexible seal which is capable of sealing on an edge or a lateral side of an embossed panel; and
(b) a key comprising,
  (i) a pair of laterally extending legs, each of said legs joined at a vertex and at least partially inserted into said at least partially hollow window frames, each leg comprising
  (ii) a pair of walls and a floor in connected relationship with said walls forming a channel,
  (iii) each floor having an aperture disposed therein;
(c) each channel comprising
  (i) at least one inwardly facing rib in connected relationship with said channel walls positioned so as to intersect a vertical axis of said at least one aperture in each of said channel floors, each of said at least one aperture in colinear alignment with said aperture in each of said window frames.

38. The system of claim 37 wherein
(a) an angle defined between said floor and said inwardly angled rib is from approximately between 10° and 80° inclusive.

39. The system of claim 38 wherein
(a) said inwardly deflecting means is an inwardly facing rib in connected relationship with said channel walls.

40. The system of claim 38 wherein
(a) said flexible seal originates from a bottom side of a laterally extending shelf from a top side of said frame and directioned inwardly toward a side of said frame.

41. The system of claim 38 wherein
(a) said flexible seal originates from an exterior side of said frame and directioned outwardly toward a bottom side of a laterally extending shelf from a top side of said frame.

42. A window framing system which comprises:
(a) at least three at least partially hollow window frames,
  (i) each of said window frames mitered at an angle so as to effect complete closure of the frame,
  (ii) each of said window frames having at least two apertures disposed therein;
  (iii) each of exterior side of said window frames having a flexible seal which is capable of sealing on an edge or a lateral side of an embossed panel; and
(b) a key comprising,
  (i) a pair of laterally extending legs, each of said legs joined at a vertex and at least partially inserted into said at least partially hollow window frames, each leg comprising
  (ii) a pair of walls and a floor in connected relationship with said walls forming a channel,
  (iii) each floor having an aperture disposed therein;
(c) each channel comprising
  (i) at least one inwardly deflecting means positioned so as to intersect a vertical axis of said at least one aperture in each of said channel floors, each of said at least one aperture in colinear alignment with said aperture in each of said window frames.

43. The system of claim 41 wherein
(a) an angle defined between said floor and said inwardly angled rib is from approximately between 10° and 80° inclusive.

44. The system of claim 42 wherein
(a) said inwardly deflecting means is an inwardly facing rib in connected relationship with said channel walls.

45. The system of claim 42 wherein
(a) said flexible seal originates from a bottom side of a laterally extending shelf from a top side of said frame and directioned inwardly toward a side of said frame.

46. The system of claim 42 wherein
(a) said flexible seal originates from an exterior side of said frame and directioned outwardly toward a bottom side of a laterally extending shelf from a top side of said frame.

47. A frame component which comprises:
(a) an interior side, an exterior side, a top side and a bottom side;
(b) said top side having a ledge extending laterally from said top side;
(c) a flexible seal extending from a bottom side of said ledge and directioned toward said exterior side for sealing engagement with an edge or a lateral side of a panel;
(d) at least one interiorly extending leg from said interior side; and
(e) at least one flexible seal extending from a bottom side of said interiorly extending leg.

48. The component of claim 47 wherein
(a) said sides form at least one void disposed therebetween.

49. The component of claim 48 which further comprises
(a) at least one reinforcing rib within said at least one void.

50. The component of claim 47 which further comprises
(a) a right angle key.

51. The component of claim 50 wherein said key comprises:
(a) a pair of laterally extending legs, each of said legs joined at a vertex;
(b) each leg comprising
  (i) a pair of walls and a floor in connected relationship with said walls forming a channel,
  (ii) each floor having an aperture disposed therein;
(c) each channel comprising
  (i) at least one inwardly facing rib in connected relationship with said channel walls positioned so as to intersect a vertical axis of said at least one aperture in each of said channel floors.

52. The component of claim 51 wherein
(a) an angle defined between said floor and said inwardly angled rib is from approximately between 10° and 80° inclusive.

53. The component of claim 52 wherein
(a) said angle is from approximately 45° and 70°.

54. The component of claim 51 wherein
(a) at least one pair of channel walls have a taper at an end thereof.

55. The component of claim 54 wherein
(a) both pairs of channel walls have a taper at said ends.

56. The component of claim 50 which comprises:
(a) a pair of laterally extending legs, each of said legs joined at a vertex;
(b) each leg comprising
  (i) a pair of walls and a floor in connected relationship with said walls forming a channel,
  (ii) each floor having an aperture disposed therein;
(c) each channel comprising
  (i) at least one inwardly deflecting means positioned so as to intersect a vertical axis of said at least one aperture in each of said channel floors.

57. The component of claim 56 wherein
(a) an angle defined between said floor and said inwardly angled rib is from approximately between 10° and 80° inclusive.

58. The component of claim 57 wherein
(a) said angle is from approximately 45° and 70°.

59. The component of claim 58 wherein
(a) at least one pair of channel walls have a taper at an end thereof.

60. The component of claim 59 wherein
(a) both pairs of channel walls have a taper at said ends.

61. The component of claim 55 wherein
(a) said inwardly deflecting means is an inwardly facing rib in connected relationship with said channel walls.

62. The component of claim 55 which comprises
(a) at least two frame components in connected relationship with the right angle key.

63. The component of claim 62 which comprises
(a) at least four frame components and four right angle keys in connected relationship.

* * * * *